Patented Apr. 5, 1932

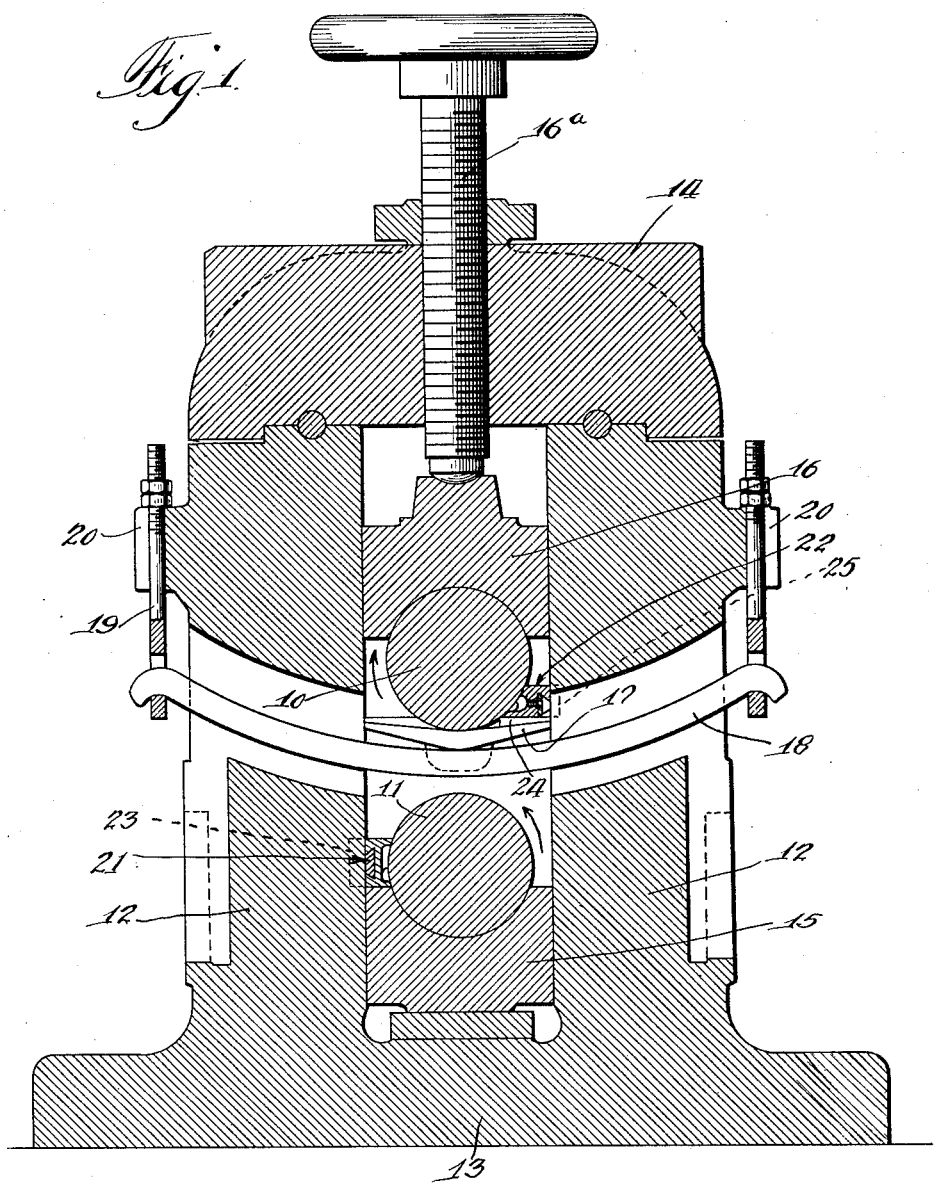

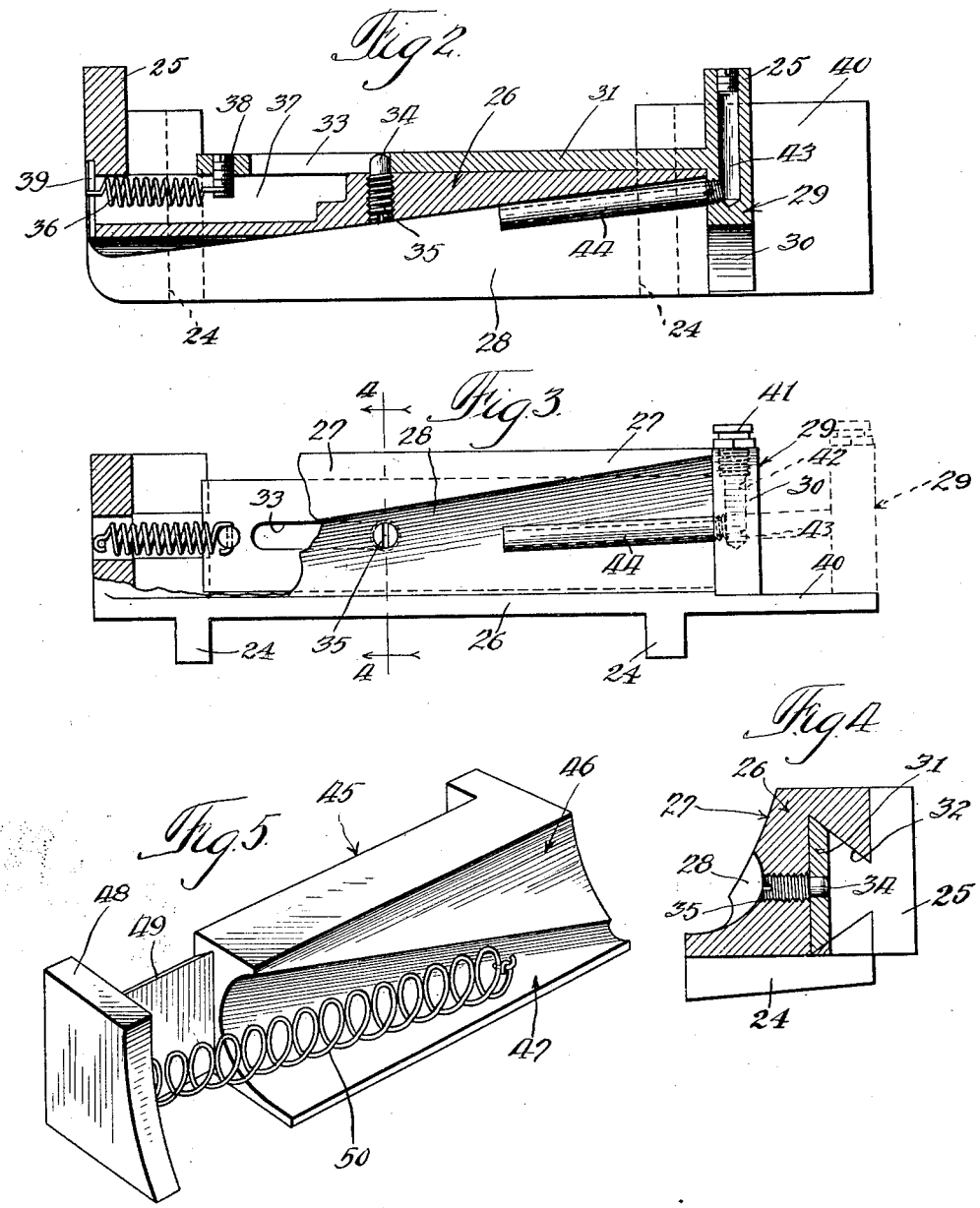

1,852,579

UNITED STATES PATENT OFFICE

ALBERT JOHNSON, OF CHICAGO, ILLINOIS

LUBRICATING SHOE

Application filed February 12, 1930. Serial No. 427,672.

This invention relates to a lubricating shoe and has special reference to a shoe for forcing a lubricant against a surface to be lubricated, such as a bearing in a rolling mill, or the like.

More particularly, this invention relates to a lubricating shoe comprising a main body portion having an open-faced recess or reservoir therein and a member relatively slidable therewith and held under spring tension in a position for forcing a lubricant against a surface to be lubricated, the main body portion being held stationary in a bearing housing adjacent the surface to be lubricated and the recessed portion containing the lubricant which is applied directly to the bearing.

In lubricating bearings, particularly those bearings in huge structures wherein the diameters of the bearings range upwardly of 4″ or 5″, a great difficulty attends the disposal of grease or other lubricants on the surfaces to be lubricated since friction uses up the lubricant in direct contact with the bearing necessitating constant renewal thereof. Applicant contemplates the renewal of the lubricant automatically and with a simplicity of construction and a minimum of expense by the provision of a substantial amount of lubricant in a reservoir adjacent the bearing, the lubricant being urged thereagainst by spring tensioning means which supplies new grease as the old grease is used up by friction.

The bearings, which are ordinarily lubricated in rolling mills, and the like, are substantially elongated structures and, of course, require a lubricant over the entire surface thereof in most instances. The present invention also contemplates the renewal of the grease in the reservoir by means of conducting the lubricant under pressure a substantial distance into the reservoir, which reservoir extends the full length of the bearing. After the reservoir is full, the lubricant backs up and moves the feeding plate outwardly against the tension of the automatic feeding means to charge the latter and provide a surplus of lubricant to fill the reservoir after the latter has fed therefrom to the surface of the bearing.

One of the objects of this invention is to provide a lubricating shoe which is simple in construction, efficient in operation and durable.

Another object of this invention is to provide a lubricating shoe having a reservoir extending the full length and in a direction longitudinally of the shoe and having a feeding member slidable in the direction of the reservoir for urging the lubricant to the surface to be lubricated.

Another object of this invention is to provide a lubricating shoe having a reservoir and an automatic feeding means for the lubricant therein, the capacity of the reservoir decreasing longitudinally of the bearing to be lubricated and in the direction of movement of said feeding means.

Other objects and advantages will hereinafter be more fully described and for a more complete description of the characteristic features of this invention reference may now be had to the following description and the accompanying drawings, in which latter:

Figure 1 is a vertical sectional view of a portion of the rolling mill in which the device of this invention is employed;

Fig. 2 is a plane central longitudinal sectional view of the lubricating shoe of this invention;

Fig. 3 is a side elevational view of Fig. 2 showing a portion broken away in section;

Fig. 4 is a vertical sectional view taken on the line 4—4 of Fig. 3; and

Fig. 5 is a perspective view of a modified form of this invention.

Referring now to the drawings and more particularly to Figure 1 thereof, the device of this invention is shown as being employed in connection with a rolling mill having a pair of cooperating rollers with shanks or bearings 10 and 11 extending respectively therefrom. These bearings are supported in end housings of the usual type employed in rolling mills preferably comprising a pair of spaced arms 12 extending upwardly from and preferably formed integrally with a supporting base portion 13, the upper ends thereof being secured together by a cross support 14 suitably secured removably thereto. Bearing blocks 15 and 16 are slidably mounted between and engage the arms 12, the lower bearing block 15 having a substantially semicircular recess on the upper surface thereof for receiving and supporting the shank or bearing 11 of the lower roller and the upper bearing block 16 having a substantially semicircular recess on the lower side thereof for bearing against the upper peripheral surface of the bearing 10 of the upper roller. The bearing 10 rests and is supported on a shelf member 17, which latter is supported on a saddle 18. The saddle 18, in turn, is supported by means of straps 19 which have apertures at the lower ends thereof for receiving the ends of the saddle 18, the upper end of the straps 19 being circular and threaded to extend through ears 20 extending from the side walls of the arms 12. The straps are held in a desired position by means of suitable nuts threaded thereon to rest on the tops of the ears 20. The upper bearing block 16 is held against displacement by the adjustable screw 16a.

The lubricating shoes, indicated generally by the numerals 21 and 22, are of slightly different designs owing to the positions in which they are disposed in the end castings. The lower shoe 21 is disposed substantially centrally with respect to the longitudinal axis of the bearing 11 and rests on the top of the bearing block 15. A pair of lugs 23 extend from the ends of the shoe to straddle one of the arms 12 thereby to hold the shoe against displacement in a direction longitudinally of the shank 11. The upper shoe 22 is provided with feet 24 to rest on the shelf member 17, the lower surface of the feet 24 being inclined the same distance with respect to the horizontal that the shelf 17 is inclined in order that the shoe proper may be horizontally disposed. This shoe 22 is disposed substantially below the longitudinal central axis of the shank 10, although in operation it has the same function and effect as the previously recited shoe 21. The shoes are merely adapted for use with structures which have already been built and, therefore, their adaptations, although seemingly somewhat different in design, are in reality the same in structure and in effect. The shoe 22 is provided with lugs 25, one lug at each end of the shoe to straddle the other supporting arm 12 to hold the shoe against displacement in a direction longitudinally of the shank or bearing 10.

Referring now more particularly to the construction of the upper lubricating shoe 22, as shown more particularly in Figs. 2 to 4, inclusive, the same comprises a main body portion 26 preferably formed of an aluminum casting whereby it may be of a light weight, although it, of course, is to be understood that there are numbers of modes of manufacture and that a great number of materials may be employed. The face side of the main body portion 26 is provided with an arcuate face 27 of substantially the same diameter as the diameter of the bearing to be lubricated. A reservoir 28 which comprises a recessed portion preferably arcuate in contour and communicating with the face 27 contains the lubricant which is to be applied to the surface to be lubricated, in this instance, the surface being the shank or bearing 10 of the upper roller of the rolling mill. The lubricant reservoir or recess 28 tapers from one end of the shoe to the other whereby the capacity for containing a lubricant is greater near one end than it is near the other. The recess or reservoir 28 is open-ended, that is, the recess is not bounded at the ends thereof by any portion of the main body portion 26. However, at the larger end thereof an end member 29, hereinafter called the feeding member, is provided and has an arcuate face of the same radius as the face 27. The recess being tapered has the effect of feeding by gravity from the larger end to the smaller end thereof whereby the lubricant is directed to the filet between the end of the roll and the reduced bearing portion. The feeding member is disposed in a slidable relation with the main body portion 26 to occupy in one of its positions a position against the end of the main body portion 26 thereby to bound or provide an end wall for the recess 28. The end member 29 has an arm 31 extending therefrom and preferably formed integrally therewith which engages a dove-tail groove 32 on the rear wall of the main body portion 26. The groove 32 guides the slide 31 in its longitudinal movement with respect to the main body portion 26, the slide 31 having a slot 33 therein for receiving a pin portion 34. The pin extends from the main body portion 26 and is formed on the end of a screw member 35, the latter threadedly engaging the main body portion. The pin 34, sliding in the slot 33, limits the longitudinal movement of the slide 31 and the end member 29.

It has hereinbefore been stated that a great difficulty attends the disposal of the lubricant upon the surface to be lubricated since friction consumes that lubricant adjacent to the bearing surface and a new supply of lubricant must be directed thereto. In order to automatically provide for such renewal, a coil spring 36 is disposed in a recess 37 of the main body portion 26 and has one end thereof secured to a screw 38 extending from one end of the slide 31, the other end of the coil spring 36 being secured to a pin 39 fixed to the main body portion at the end thereof in which the smaller end of the reservoir 28 is disposed. The spring, therefore, normally tends to urge the feeding member 29 in a direction against the larger end of the reservoir 28 and toward the smaller end thereof.

A platform 40 is preferably cast integrally with the main body portion 26 and extends from the end thereof outwardly therefrom to provide a lower support for the feeding plate 29 and also to prevent grease from falling between the feeding plate and the main body portion when the reservoir 28 is filled, as will now be more fully described. The reservoir 28 is supplied with a lubricant through the fitting 41 secured to the upper end of the feeding member 29 in the usual manner and has a passageway 42 extending downwardly therefrom to communicate with a passageway 43, which latter, in turn, communicates with a conduit 44 secured to the end member 29 and extending inwardly a substantial distance into the recess or reservoir 28. Lubricant is supplied to the fitting 41 through the conduit 44 by a force feed system, such, for example, as is ordinarily employed and known to the commercial world as an alemite system. From the conduit 44 the grease or lubricant fills the recess 28 from end to end and thereafter the lubricant backs up and moves the end member 29 outwardly along the platform 40, the grease being retained by the platform 40 from dropping downwardly by gravity. The end member 29 is limited in its movement outwardly by the pin and slot 34 and 33, respectively, as hereinbefore described, whereafter as the bearing is rotated and the lubricant is used up the lubricant is renewed by means of the reserve on the platform 40 being moved into the recess or reservoir 28 by the feeding plate 29 to renew the supply used from the recess, this movement being actuated by the spring 36. The outer and inner positions of the feeding plate 29 is shown in the respective dotted and full line positions thereof in Fig. 3.

Referring now more particularly to Fig. 5 of the drawings, a lubricating shoe of a modified form is shown wherein the main body portion 45 is provided with an arcuate face 46 for disposition adjacent the bearing to be lubricated, the contour being substantially the same as the contour of the bearing. A recess 47 is provided in the face 46 and communicates therewith, the recess being frustroconical in contour thereby having the ends thereof opening into the ends of the main body portion. A feeding plate 48 is disposed adjacent the end of the main body portion to fit against the enlarged open end or base of the frustro-conical shaped recess 47 in one position thereof.

An arm 49, preferably formed integrally with the feeding member 48, extends therefrom to slidably engage the rear face portion of the main body portion 45, the arm 49 having converging side edges to fit in dovetail fashion a correspondingly shaped groove in the main body portion. A coil tension spring 50 is disposed in the groove 41 and is secured at the ends thereof to the main body portion and the feeding plate 48, respectively. The coil spring 50 being disposed in the recess or reservoir 47 agitates the lubricant disposed therein by reason of its normally tending to collapse and draw without the feeding member 48.

The lubricant in this construction is scraped off on the upper edge of the feeding member 48 between the end of the main body portion 45 and the feeding member. Where this construction is employed it is not necessary to include a platform for preventing the grease or lubricant from dropping through, since the platform is provided by a part of the rolling mill in which the housing is disposed. The construction shown herein may be employed in lieu of the lower lubricating shoe 21, since a platform is not therein required to extend from the main body portion, as is shown with reference to the upper lubricating shoe 22.

While but two embodiments of this invention are herein shown and described, it is to be understood that various modifications may be apparent to those skilled in the art without departing from the spirit and scope of this invention and, therefore, the same is only to be limited by the scope of the prior art and the appended claims.

I claim:

1. A shoe for lubricating bearing surfaces of rolling mills and the like comprising a main body portion having a face side disposed adjacent said bearing surface and a longitudinally extending recess communicating with said face side for containing a lubricant, said recess being of a greater capacity as it approaches one end of said main body portion, a feeding plate slidable longitudinally of said main body portion for forcing said lubricant against said bearing surface, and automatic means for actuating said feeding plate.

2. A shoe for lubricating bearing surfaces of rolling mills and the like comprising a main body portion having a face side disposed adjacent said bearing surface and a longitudinally extending recess communicating with said face side for containing a lubricant, said recess tapering uniformly from one end to the other, a feeding plate slidable longitudinally of said main body portion for forcing said lubricant against said bearing surface, and automatic means for actuating said feeding plate.

3. A shoe for lubricating bearing surfaces of rolling mills and the like comprising a main body portion having a face side disposed adjacent said bearing surface and an open-ended longitudinally extending recess communicating with said face side for containing a lubricant, and a feeding plate slidable longitudinally of said main body portion acting in a path against one of said open ends of said recess for forcing said lubricant against said bearing surface, and automatic means for actuating said feeding plate.

4. A shoe for lubricating bearing surfaces of rolling mills and the like comprising a main body portion having a face side disposed adjacent said bearing surface and an open-ended longitudinally extending recess communicating with said face side for containing a lubricant, a feeding plate disposed adjacent one of said open ends of said recess, an arm extending from said feeding plate for slidable engagement with said main body portion, and automatic means associated with said arm for actuating said feeding plate for forcing said lubricant against said bearing surface.

5. A shoe for lubricating bearing surfaces of rolling mills and the like comprising a main body portion having a face side disposed adjacent said bearing surface and an open-ended longitudinally extending recess communicating with said face side for containing a lubricant, a feeding plate disposed adjacent one of said open ends of said recess, an arm extending from said feeding plate, said main body portion having guiding means for receiving said arms in a slidable engagement therewith, and automatic means for actuating said feeding plate for forcing said lubricant against said bearing surface.

6. A shoe for lubricating bearing surfaces of rolling mills and the like comprising a main body portion having a face side disposed adjacent said bearing surface and an open-ended longitudinally extending recess communicating with said face side for containing a lubricant, a platform extending from the end of said main body portion in the direction of said recess, a feeding plate slidable on said platform adjacent one of said open ends, and automatic means tending to urge said feeding plate against the end of said main body portion to force said lubricant against said bearing surface.

7. A shoe for lubricating bearing surfaces of rolling mills and the like comprising a main body portion having a face side disposed adjacent said bearing surface and an open-ended longitudinally extending recess communicating with said face side for containing a lubricant, a platform extending from the end of said main body portion in the direction of said recess, a feeding plate slidable on said platform adjacent one of said open ends, an arm extending from said feeding plate for slidable engagement with said body portion, and automatic means associated with said arm for tending to urge said feeding plate against the end of said main body portion to force said lubricant against said bearing surface.

8. A shoe for lubricating bearing surfaces of rolling mills and the like comprising a main body portion having an arcuate face side conforming substantially to and disposed adjacent said bearing surface and a longitudinally extending recess communicating with said face side for containing a lubricant, a platform extending from the end of said main body portion in the direction of said recess, a feeding plate slidable on said platform, said recess being tapered in a direction away from said feeding plate, an arm extending from and secured to said feeding plate for slidable engagement with said main body portion, and a tension spring secured between said arm and said body portion for tending to urge said feeding plate against the end of said main body portion thereby to force said lubricant against said bearing surface.

9. A shoe for lubricating bearing surfaces of rolling mills and the like comprising a main body portion having a face side disposed adjacent said bearing surface and a longitudinally extending recess communicating with said face side for containing a lubricant, a feeding plate slidable longitudinally of said main body portion for forcing said lubricant against said bearing surface, means carried by said feeding plate and extending into said recess for renewing the supply of lubricant therein, and automatic means for actuating said feeding plate.

10. A shoe for lubricating bearing surfaces of rolling mills and the like comprising a main body portion having a face side disposed adjacent said bearing surface and a longitudinally extending recess communicating with said face side for containing a lubricant, a platform extending from the end of said main body portion in the direction of said recess, a feeding plate slidable on said platform longitudinally of said main body portion for forcing said lubricant against said bearing surface, means carried by said feeding plate and extending into said recess for renewing the supply of lubricant therein, and automatic means for actuating said feeding plate.

In witness whereof I have hereunto subscribed my name.

ALBERT JOHNSON.